United States Patent

[11] 3,617,579

[72] Inventors Frank C. Gunderloy, Jr.
Santa Susana;
Cliff Y. Fujikawa, Encino, both of Calif.
[21] Appl. No. 889,719
[22] Filed Dec. 31, 1969
[45] Patented Nov. 2, 1971
[73] Assignee The United States of America as
represented by the Secretary of the Interior

[54] PROCESS FOR THE PARTIAL DENITRIFICATION OF A DILUTE NITRATE ION SOLUTION
1 Claim, No Drawings
[52] U.S. Cl. .................................................. 210/59
[51] Int. Cl. .................................................. C02c 5/02
[50] Field of Search .......................................... 23/101–104, 220; 210/50, 59–61

[56] References Cited
UNITED STATES PATENTS
| | | | |
|---|---|---|---|
| 825,637 | 7/1906 | Brown ........................... | 210/50 |
| 3,423,309 | 1/1969 | Albertson ..................... | 210/18 X |

OTHER REFERENCES

Reviews and Abstracts, Journal of the Water Pollution Control Federation, Vol. 33, No. 7, July, 1961, p. 786, Laboratory Experiments with Biological Removal of Nitrogen from Waste Water in the Form of Nitrogen Gas, G. Bringmann et al., Gesundh. Inc., 80, 364 (1959)

G. K. Young et al., Chemical Reduction of Nitrate in Water, Journal of the Water Pollution Control Federation, Vol. 36, No. 3, Mar. 1964, pp. 395– 8.

*Primary Examiner*—Reuben Friedman
*Assistant Examiner*—Thomas G. Wyse
*Attorneys*—Ernest S. Cohen and Benjamin H. Bochenek ABSTRACT: A process for the partial denitrification of a dilute nitrate ion aqueous solution wherein the solution is treated in the presence of a catalytic quantity of cupric ion and at an initial pH between 7 and 11 with ferrous ion to thereby reduce the nitrate and partially denitrify the solution.

PROCESS FOR THE PARTIAL DENITRIFICATION OF A DILUTE NITRATE ION SOLUTION

BACKGROUND OF THE INVENTION

The presence of nitrate ion in water presents several distinct problems. In high concentrations, it can cause methemoglobinemia, a disease of the newborn, and it serves as a nutrient for algae at any concentration. Algae bloom becomes a problem in many water environments such as in reservoir storage.

Nitrates occur in natural and reclaimed waters in amounts ranging from a fraction of a part per million parts of water to several hundred p.p.m. (p.p.m. here and throughout the specification refers to parts of solute per million parts of solvent), calculated as nitrate-nitrogen ($NO_3^1$-N). The source may be natural, such as leaching from nitrate deposits (e.g., guano in limestone cave areas), the natural decay and oxidation of nitrogenous organic matter (protein) as carried out by certain micro-organisms and the fixation of atmospheric nitrogen as NO and $NO_2$ from electrical discharges during thunderstorms. The sources may also be man made, such as leaching from agricultural lands treated with nitrogenous fertilizers, effluent from fertilizer manufacturing plants, and effluent from other chemical and manufacturing processes that employ nitrates in one form or another. Regardless of the initial water quality, secondary water treatments based on biological oxidation of organic matter (e.g., activated sludge and trickling filter processes) may in themselves introduce additional nitrate. Accordingly, almost all secondary effluent contains an appreciable quantity of nitrate ion.

Previous natural and reclaimed water nitrate removal processes include control of secondary water treatment processes in such a manner that nitrification is minimized; ion exchange; extraction and biological denitrification. Controlling the secondary treatment processes can be effective but suppression of nitrification is often accompanied by some undesirable effect, such as decreased Biochemical Oxygen Demand (a measure of the biodegradable organic content of the water) removal. Ion exchange is very efficient but costs can be high. Extraction works well on concentrates but it is inefficient for dilute nitrate solutions.

Ferrous ion, as either ferrous sulfate or ferrous hydroxide, has formed the basis for analytical determinations of nitrate ion, converting the nitrate ion to ammonia. Ferrous ion has also been studied for use in water reclamation and has been shown to be capable of 90 percent reduction of nitrate in the presence of copper hydroxide at the 100 p.p.m. nitrate-nitrogen level [J. Water Pollution Control Federation, 36, 395–8 (1964)]. Additionally, chemical reduction of dilute nitrite solutions by ferrous salts to yield nitric oxide has been reported in acid solution but the reduction is reported to have almost stopped at pH 6 or above. A summary of almost all possible nitrate reduction reaction sequences was simultaneously reported [Soil Sci. Am. Proc., 30 (2), 193–6 (1966)].

Ammonia has high water solubility and accordingly the conversion of nitrate to ammonia is not a true denitrification wherein nitrogen loss occurs as by conversion of nitrate to a nitrogenous gas which is normally chemically inert and water insoluble or only slightly water soluble. The ammonia must therefore be removed as by a physical stripping step since it cannot simply be left in the water since eventually as part of the biological nitrogen cycle it will be reconverted to nitrate.

SUMMARY OF THE INVENTION

A partial denitrification of a dilute nitrate ion aqueous solution is achieved by treatment of the solution with ferrous ion in the presence of a catalytic quantity of cupric ion at an initial pH between 7 and 11.

DESCRIPTION OF THE INVENTION

An object of the present invention is the provision of a process for the removal of nitrate ion from a dilute nitrate solution.

A further object of the present invention is the provision of a process for the denitrification of natural and reclaimed water.

A still further object of the present invention is the provision of a process for the denitrification of sewage and in particular a process for the denitrification of secondary and tertiary sewage effluent.

Further objects will become apparent upon reading the undergoing specification and claims.

A process is provided for the partial denitrification of a dilute nitrate ion aqueous solution by direct denitrification reaction with ferrous ion. Ferrous sulfate is the preferred source of ferrous ion since it is economically attractive and is readily available, for example, as crude copper as ($FeSO_4 \cdot 7 H_2O$). Any source of ferrous ion can be employed, however, such as ferrous hydroxide or ferrous chloride. Mole ratios of ferrous ion to nitrate ion of 2:1 to 12:1 can conveniently be employed, however, a mole ratio of 4:1 to 8:1 is preferred.

The process can be employed for the denitrification of any dilute nitrate ion solution containing up to about 75 p.p.m. of nitrate ion calculated as nitrate-nitrogen (e.g., up to about 50 p.p.m. of nitrate-nitrogen). As a practical matter, dilute nitrate ion solutions containing from about 1 to 10 p.p.m. of nitrate-nitrogen will be subjected to treatment since this is the nitrate ion concentration near that of the average secondary sewage effluent. The process will primarily be employed for the denitrification of secondary sewage effluent, in tertiary water reclamation or sewage treatment, as a treatment for agricultural waste waters rich in fertilizer leachings or as a treatment for natural nitrate-rich waters. The process can also be used for the denitrification of raw sewage or primary sewage effluent or other aqueous systems wherein nitrate contaminants may be present.

The partial denitrification of the present invention is affected by treating a dilute nitrate ion aqueous solution at a pH which initially is between 7 and 11. Although the solution must initially be at a pH between 7 and 11, the pH does not remain constant during the course of the reaction and in general drops as the reaction progresses. Accordingly, if the pH of the solution is not between 7 and 11, it should be adjusted either prior to or after the introduction of the ferrous ion into the solution. It is preferred to adjust the pH to between 7 and 9. The pH adjustment can be made, for example, with lime or sodium hydroxide. When adjusting the pH it is best to avoid buffering the solution since fixing the pH markedly reduces the progress of the reaction and necessitates materially increased reaction times.

The denitrification according to the present invention requires catalytic quantities of cupric ion. A cupric ion concentration of ½ to 20 p.p.m. may conveniently be employed, however a cupric ion concentration of ½ to 5 p.p.m. is preferred. Any source of cupric ion can be employed such as cupric chloride or cupric sulfate.

It is preferred to conduct the reaction under anaerobic conditions (i.e., in an oxygen-free atmosphere) to avoid oxidation of the ferrous ion by air, but these conditions are not required to obtain partial denitrification. However, if anaerobic conditions are not observed, extra ferrous ion may be added to allow for the oxidation of ferrous ion by air. If anaerobic conditions are desired, the reaction can be conducted in a closed container under, for example, nitrogen or helium gas. The reaction time can be conveniently determinded by following the course of the reaction by conventional means and stopping the reaction when the desired reduction and denitrification is achieved. The reaction is normally conducted at atmospheric pressure and near ambient temperature but the exact pressure and temperature employed is not critical. As a practical matter the reaction is normally conducted between ambient temperature and 120° F.

Denitrification or "nitrogen loss" according to the present process primarily represents evolution of a mixture of nitrogen ($N_2$) and nitrous oxide ($N_2O$) gas. "Nitrogen loss" does not refer to nitrite and ammonia reduction products which are either chemically reactive or have high water solubility but refers to a loss of nitrogen from the solution by evolution of a normally chemically inert and water-insoluble or slightly water-soluble gas and accordingly a true denitrification of the solution. The "nitrogen loss" according to the present invention has been as high as 75 percent based on the original nitrate-nitrogen ($NO_3^1$-N) content of the solution. "Nitrogen loss" plus nitrite and/or ammonia production has approached 100 percent. Since total denitrification (100 percent "nitrogen loss") has not been affected according to the present invention, the process of the present invention can be employed in combination with other physical or chemical methods to further reduce the nitrogen content. For example, reduction-deammination sequence may be employed particularly if nitrite ion is a major reduction product. The reduction-deammination sequence is based on reduction of nitrate to nitrite ion and subsequent deammination of a primary amine with the nitrite. Deammination agents include sulfamic acid and urea. A second approach would be to couple ferrous ion reduction with an ammonia stripping step wherein the ammonia is removed in conventional manner by passage of air through the liquid mixture.

The following nonlimitive examples illustrate the invention:

DESCRIPTION OF THE PREFERRED EMBODIMENTS

Example 1

To approximately 190–195 milliliters of water in a 200 milliliter volumetric flask were added 2 milliliters of a 0.5712M $FeSO_4$ and 0.0022M $H_2SO_4$ stock solution and 1 milliliter of a 0.0157M $CuSO_4$ stock solution. The pH of the aqueous solution in the volumetric flask was adjusted to 8.40 with 0.9755 NaOH. 1 milliliter of a 0.1428M $KNO_3$ stock solution, water to bring to volume and a Teflon-covered magnetic stirring bar were introduced into the volumetric flask. The stoppered mixture was placed in a constant temperature bath (85° F.) 10 minutes after the addition of the $KNO_3$ and stirred mechanically under a blanket of helium gas. After 24 hours the mixture was removed from the constant temperature bath and allowed to cool. The final pH measured 5.47. The nitrogen content was determined to be:
  2.0 p.p.m. ammonia-nitrogen ($NH_3$-N)
  1.0 p.p.m. nitrate-nitrogen ($NO_3^1$-N)
  0.1 p.p.m. nitrite-nitrogen ($NO_2^1$-N)
  3.8 p.p.m. nitrous oxide-nitrogen ($N_2O$-N)
  2.6 p.p.m. $N_2$-N

Example 2

The procedure of example 1 was followed except that the pH of the aqueous solution in the volumetric flask was adjusted to 8.42. The final pH measured 5.42. The nitrogen content was determined to be:
  1.9 p.p.m. ammonia-nitrogen ($NH_3$-N)
  1.4 p.p.m. nitrate-nitrogen ($NO_3^1$-N)
  0.5 p.p.m. nitrite-nitrogen ($NO_2^1$-N)
  3.5 p.p.m. nitrous oxide-nitrogen ($N_2O$-N)
  2.4 p.p.m. $N_2$-

Example 3

The procedure of example 1 was followed except that the pH of the aqueous solution in the volumetric flask was adjusted to 8.00. The final pH measured 5.30. The mixture analyzed:
  1.8 p.p.m. ammonia-nitrogen ($NH_3$-N)
  0.7 p.p.m. nitrate-nitrogen ($NO_3^1$-N)
  0.3 p.p.m. nitrite-nitrogen ($NO_2^1$-N)
indicating 7.2 p.p.m. "nitrogen loss".

Example 4

The procedure of example 1 was followed except that the pH of the aqueous solution in the volumetric flask was adjusted to 7.59. The final pH measured 5.11. The mixture analyzed:
  2.1 p.p.m. ammonia-nitrogen ($NH_3$-N)
  1.2 p.p.m. nitrate-nitrogen ($NO_3^1$-N)
  0.2 p.p.m. nitrite-nitrogen ($NO_2^1$-N)
indicating 6.5 p.p.m. "nitrogen loss".

Example 5

To approximately 190–195 milliliters of water in a 200 milliliter volumetric flask were added 50 p.p.m. of nitrate ion calculated as nitrate-nitrogen ($NO_3^1$-N) using a standard nitrate solution containing 2 milligrams $NO_3^1$-N per milliliter by means of a small burette. Eight moles of ferrous ion per mole of nitrate ion were added to the nitrate solution in the form of solid $FeSO_4 \cdot 7H_2O$. 10 p.p.m. of cupric ion in the form of a standard cupric chloride solution containing 1 milligram cupric ion per milliliter were then added to the aqueous solution by means of a pipette. The volume in the volumetric flask was then adjusted to the 200 milliliter mark with water. After thorough mixing the pH of the solution was adjusted to 7.1 by adding a few drops of 6M NaOH solution. The solution was then placed in a constant temperature bath (85° F.) and stirred mechanically under a blanket of nitrogen gas. A test sample taken after 48 hours analyzed:
  6.8 p.p.m. nitrate-nitrogen ($NO_3^1$-N)
  0.5 p.p.m. nitrite-nitrogen ($NO_2^1$-N)
  16.5 p.p.m. ammonia-nitrogen ($NH_3$-N)
indicating 26.2 p.p.m. "nitrogen loss".

Example 6

The procedure of example 5 was followed with the following exceptions: the initial nitrate ion concentration calculated as nitrate-nitrogen was 10 p.p.m. instead of 50 p.p.m.; 5 p.p.m. of cupric ion instead of 10 p.p.m. was added by means of a pipette and the pH of the solution was adjusted to 9.0 instead of 7.1. A test sample taken after 24 hours analyzed: X
  2.3 p.p.m. nitrate-nitrogen ($NO_3^1$-N)
  0.4 p.p.m. nitrite-nitrogen ($NO_2^1$-N)
  4.0 p.p.m. ammonia-nitrogen ($NH_3$-N)
indicating 3.3 p.p.m. "nitrogen loss".

We claim:
1. A process for the partial denitrification of natural and reclaimed water, said water containing from about 10 to 50 p.p.m. of nitrate ion calculated as nitrate-nitrogen, comprising treating said water in the presence of 5 to 10 p.p.m. of cupric ion and at an initial pH between 7.1 and 9.0 with about 8 moles of ferrous ion, in the form of ferrous sulfate, per mole of nitrate ion to thereby reduce said nitrate and partially denitrify said water primarily by evolving gaseous nitrogen and nitrous oxide.

* * * * *